(12) United States Patent
Shen et al.

(10) Patent No.: US 8,088,509 B2
(45) Date of Patent: Jan. 3, 2012

(54) LITHIUM ION BATTERY

(75) Inventors: Xi Shen, Shenzhen (CN); Jianhua Zhu, Shenzhen (CN); Qing Lai, Shenzhen (CN); Yili Han, Shenzhen (CN)

(73) Assignee: BYD Company Limited, Shenzhen (CN)

(*) Notice: Subject to any disclaimer, the term of this patent is extended or adjusted under 35 U.S.C. 154(b) by 886 days.

(21) Appl. No.: 12/084,650

(22) PCT Filed: Apr. 11, 2006

(86) PCT No.: PCT/CN2006/000642
§ 371 (c)(1),
(2), (4) Date: May 7, 2008

(87) PCT Pub. No.: WO2007/053990
PCT Pub. Date: May 18, 2007

(65) Prior Publication Data
US 2009/0142658 A1    Jun. 4, 2009

(30) Foreign Application Priority Data
Nov. 8, 2005  (CN) .......................... 2005 1 0115706

(51) Int. Cl.
*H01M 6/42* (2006.01)
(52) U.S. Cl. ........ 429/159; 429/131; 429/133; 429/140; 429/153; 429/161; 429/163; 429/167; 429/170
(58) Field of Classification Search .................. 429/131, 429/133, 140, 153, 159, 161, 163, 164, 167, 429/170
See application file for complete search history.

(56) References Cited

U.S. PATENT DOCUMENTS
1,152,247 A    8/1915  Walker
(Continued)

FOREIGN PATENT DOCUMENTS
CN    1291355 A    4/2001
(Continued)

OTHER PUBLICATIONS
Office Action Response filed Apr. 27, 2010 in the Canadian Patent Office, for corresponding Canadian Patent Application No. 2,628,852.
(Continued)

*Primary Examiner* — Patrick Ryan
*Assistant Examiner* — Ben Lewis
(74) *Attorney, Agent, or Firm* — The Nath Law Group; Jerald L. Meyer; Jiaxiao Zhang

(57) ABSTRACT

Disclosed herein is a lithium ion battery comprising an electrode core, an electrolyte solution, a metal shell and an end cover assembly, said metal shell comprising an outer wall, an inner wall and a chamber, said electrode core and electrolyte solution being located in the chamber of the metal shell, and said electrode core being connected to the end cover assembly with a electrode terminal of the electrode core, wherein the number of said electrode core is more than one, and the multiple electrode cores are located in the chamber of the metal shell. The lithium ion battery according to the present invention possesses excellent disperse heat dispersion, high mechanical safety, and good high rate discharge performance. In addition, the battery according to the present invention solves the problems of the "wound battery" of the prior art that the electrode plate is long and difficult to wind, and the "stacked battery" of the prior art that the electrode plate is difficult to prepare and pile up by dividing the electrode core of high capacity into multiple electrode core of low capacity placed abreast in the metal shell, whereby simplifying the preparation thereof.

8 Claims, 4 Drawing Sheets

U.S. PATENT DOCUMENTS

| | | | |
|---|---|---|---|
| 4,346,151 A | 8/1982 | Uba et al. | |
| 6,004,689 A | 12/1999 | Walker et al. | |
| 2002/0012833 A1 | 1/2002 | Gow et al. | |
| 2003/0064283 A1* | 4/2003 | Uemoto et al. | 429/149 |

FOREIGN PATENT DOCUMENTS

| | | |
|---|---|---|
| CN | 2578996 Y | 10/2003 |
| CN | 1588688 A | 3/2005 |
| CN | 2702452 Y | 5/2005 |
| CN | 1653389 A | 8/2005 |
| EP | 1 952 475 B1 | 6/2011 |
| JP | 9-92237 | 4/1997 |
| JP | P2003-100269 A | 4/2003 |
| JP | P2003-249200 A | 9/2003 |

OTHER PUBLICATIONS

Office Action issued Nov. 5, 2010 by the Canadian Intellectual Property Office, for corresponding Canadian Patent Application No. 2,628,852.

Supplementary European Search Report completed Nov. 25, 2008, for corresponding European Patent Application No. EP 06 72 2294.

Office Action issued Aug. 4, 2009 by the European Patent Office, for corresponding European Patent Application No. EP 06 72 2294.

Office Action issued Jul. 30, 2010 by the Korean Intellectual Property Office, for corresponding Korean Patent Application No. 10-2008-7012534.

Office Action issued Apr. 18, 2008 by the State Intellectual Property Office (SIPO), for corresponding Chinese Patent Application No. 2005101157063.

* cited by examiner

LITHIUM ION BATTERY

FIELD OF INVENTION

The present invention relates to a lithium ion battery, and in particular relates to a power type lithium ion battery which possesses an excellent heat dispersion, high mechanical safety and good high rate discharge performance.

BACKGROUND OF INVENTION

As the capacity of the lithium ion battery increases, its specific capacity is increasingly high, thus the battery generates more heat during the process of charge and discharge. Accordingly, it is required for the battery itself that the heat generated in the inside of the battery can be dispersed in time. However, the currently used shell of the lithium ion battery is usually in the form of cylinder or square with a relatively small surface area for dispersing the heat, such that during the process of charge, especially in the case of overcharge, the rate of heat-dispersing is far lower than that of heat-generating, resulting that the inner temperature of the battery sharply increases, the stabilities of the electrolyte solution, electrode active materials and binders become poor, the performance of the battery worsens, and the safety problems such as the explosion and fire may even occur.

Because the lithium ion battery possesses a relatively high inner resistance compared with the other secondary batteries, the voltage sharply decreases, the discharge time is greatly shortened, and the capacity is significantly lowered during the process of discharge at large current. The low conductivity of the conventional electrode is one of the main reasons for the lithium ion battery possessing a relatively high inner resistance. Until now, in most commercial lithium ion batteries one single electrode tab (also known as an electrode terminal) is used to conduct the current, which makes the current conducted only at several limited welding points. As a result, the conductivity is low and the distribution of the current is not uniform during the process of charge and discharge.

In addition, the electrode core of the battery of the prior art is usually one single electrode core with a structure of winding or piling-up. However, in the preparation of the battery with a high capacity and high power, the single electrode core with a structure of winding has the disadvantages that the electrode plate is long and difficult to prepare and wind, while the single electrode core with a structure of piling-up has the disadvantages that the practical process is complicate, the electrode plate is difficult to prepare and pile up, and the yield of the eligible products is low.

To sum up, it is very important for the improvement of performances of the power type lithium ion battery to effectively increase the heat-dispersing area of the lithium ion battery to improve the heat dispersion and the safety of the battery, to lower the inner resistance and improve the discharge performance with a high current of the battery, and to increase the yield of the eligible products and reduce the cost.

SUMMARY OF THE INVENTION

An object of the present invention is to provide a lithium ion battery which possesses an excellent heat dispersion and good high rate discharge performance to solve the above-mentioned problems of the prior art.

The above object is achieved by a lithium ion battery comprising an electrode core, an electrolyte solution, a metal shell and an end cover assembly, said metal shell comprising an outer wall, an inner wall and a chamber, said electrode core and electrolyte solution being located in the chamber of the metal shell, and said electrode core being connected with the end cover assembly by an electrode terminal of the electrode core, wherein the number of said electrode core is more than one, and the multiple electrode cores are located in the chamber of the metal shell.

Furthermore, the metal shell is opened at both ends, and the end cover assembly comprises:

a top cover assembly comprising an upper cover, multiple positive poles, an insulator and a first metal connector, the multiple positive poles being connected with both the electrode terminals of the electrode core and the first metal connector, and the insulator being interposed between the upper cover and the positive poles; and a bottom cover assembly comprising a lower cover, multiple negative poles, an insulator and a second metal connector, the multiple negative poles being connected with both the electrode terminals of the electrode core and the second metal connector, and the insulator being interposed between the upper cover and the negative poles.

The present invention has the advantages as follows.

1. The problems that the electrode plate of the "wound battery" of the prior art is long and difficult to wind, and the electrode plate of the "stacked battery" of the prior art is difficult to prepare and pile up are avoided and solved by dividing the electrode core of high capacity battery into multiple wound electrode cores placed abreast in the cylinder shell, whereby simplifying the process for preparation.

2. In the lithium ion battery according to the present invention, excellent heat dispersion can be achieved by enlarging the surface area of the battery shell for dispersing the heat without decreasing the inner using space of the battery.

3. The effective sectional area for directing current is greatly increased by the structure of the top cover assembly and the bottom cover assembly respectively comprising multiple parallel electrode poles, and thus the high rate discharge performance is improved.

4. Higher mechanical safety measured by test of mechanical shock tolerance is achieved by preventing the electrode core from moving and damage caused by the shock of outside force in case of falling, concussion and the like with the multiple parallel grooves on the outer wall of the metal shell functioning as the strengthening bars.

BRIEF DESCRIPTION OF THE REFERENCE NUMBERS IN THE DRAWINGS

| 1: | an electrode core | 2: | a metal shell |
| 21: | an outer wall | 22: | an inner wall |
| 211: | a groove | 221: | a convex portion |
| 23: | a chamber | 3: | a top cover assembly |
| 31: | an upper cover | 32: | a positive pole |
| 33: | a first metal connector | 34: | a nut |
| 35: | a gasket | | |

DETAILED DESCRIPTION OF THE PREFERRED EMBODIMENTS

Figure 1:
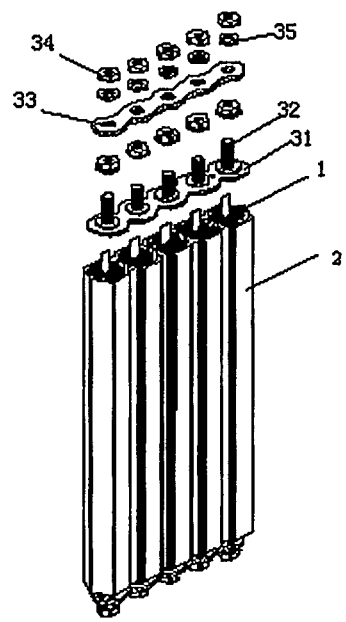
FIG. 1 is a schematic view showing the structure of the lithium ion battery according to the present invention.

As shown in FIG. 1, the lithium ion battery according to the present invention comprises an electrode core 1, an electrolyte solution, a metal shell 2 and an end cover assembly 3, said metal shell 2 comprising an outer wall 21, an inner wall 22 and a chamber 23, said electrode core 1 and electrolyte solution being located in the chamber 23 of the metal shell 2, and said electrode core 1 being connected with the end cover assembly 3 by an electrode terminal of the electrode core 11, wherein the number of said electrode core 1 is more than one, and the multiple electrode cores 1 are located in the chamber 23 of the metal shell 2.

According to the present invention, the number of the electrode cores 1 is not specially limited as long as the total capacity of the multiple electrode cores 1 can meet the requirement. The number of the electrode cores 1 is preferably 3-10, and more preferably 5-8. In the present invention, the problems of the "wound battery" of the prior art that the electrode plate is long and difficult to wind, and the problems of the "stacked battery" of the prior art that the electrode plate is difficult to prepare and pile up are avoided and solved mainly by dividing one single large electrode core into multiple small electrode cores to increase the heat-dispersing area of the battery without decreasing the capacity and increasing the volume of the metal shell of the battery whereby simplifying the manufacture process. Therefore, the structure and constitution of the electrode cores 1 are not specially limited and may be those of the conventional battery. For example, the electrode core may comprise a positive electrode plate, a separating membrane, and a negative electrode plate orderly wound into a wound electrode core by any known process. The electrode terminals of the positive electrode plate and negative electrode plate have been well known to those skilled in the art. For example, the electrode terminal of the positive electrode plate may be an aluminum wire, and that of the negative electrode plate may be a nickel wire, a copper wire, a stainless steel wire, or various alloy wires. In the examples of the present invention, the electrode terminal of the positive electrode plate is preferably an aluminum wire, and that of the negative electrode plate is preferably a nickel wire.

The electrode cores 1 are placed in the chamber 23 of the metal shell 2, and the electrode terminals of the positive and negative electrode plates of each electrode core 1 are respectively connected to the end cover assembly 3 in any known manners such as welding, riveting, screwing and the like.

Figure 2:
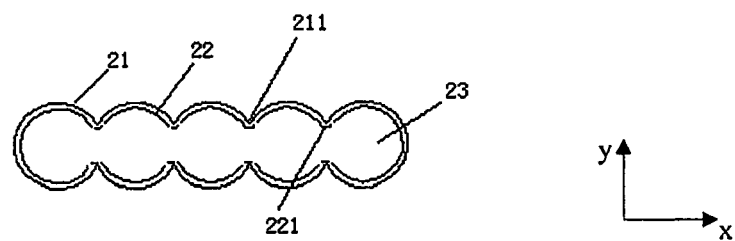
FIG. 2-5 are cross section views showing the metal shell of the lithium ion battery according to the present invention.

According to the present invention, the shape of the metal shell 2 is not specially limited as long as it can hold the above multiple electrode cores 1. It is preferred that the chamber 23 of the metal shell 2 comprises multiple inner cavities, each of which holds one electrode core 1, such that the circumambience of each electrode core is separately embraced by one inner cavity, and the heat dispersion will be better. The number of the inner cavities may be the same as that of the electrode cores 1 or more, and preferably is the same. The inner cavities are preferably intercommunicated in order that each electrode core 1 is under the same condition, and more preferably intercommunicated throughout the height of the metal shell 2. The metal shell 2 with the above-mentioned structure may be obtained in various manners, for example in a manner that multiple small metal shells are joint together and then intercommunicated, and in another manner that one large metal shell is divided into multiple inner cavities suitable for the electrode cores by any known process such as intercalating a separating board. In this invention, it is preferred to divide the chamber 23 into multiple inner cavities in such a manner that multiple convex portions 221 are formed on the surface of the inner wall 22 of the metal shell 2. That is, multiple convex portions 221 are provided on the inner wall 22 of the metal shell 2, and the distance between two adjacent convex portions 221 is suitable for the electrode cores 1. It is preferred that multiple convex portions 221 are uniformly provided on the inner wall 22 of the metal shell 2. The convex portion 221 are not specially limited to particular size and/or shape as long as it can separately fix each electrode core 1 in the corresponding inner cavity and allow the electrolyte solution to pass. Preferably, the convex portion 221 is minimized as possible to lighten the battery and increase the using space of the battery, provided that the electrode core 1 is able to be fixed in the inner cavity. More preferably, the convex portions 221 are symmetrically provided in the direction along the length of the metal shell 2, and the distance between two convex portions symmetrically provided is preferably 50 to 90% of the maximum width of the inner cavity. According to the present invention, said length is the distance in the direction of the x axis as shown in FIG. 2, said width is the distance in the direction vertical to x axis i.e., the y axis as shown in FIG. 2, and said height is the distance in the direction vertical to both the x axis and the y axis.

According to the present invention, the shape of the outer wall 21 of said metal shell 2 is not specially limited, and may be any known shape for the outer wall of the battery such as cylinder, square and the like. Multiple grooves 211 are preferably provided on the outer wall 21 of the metal shell 2 in order to improve the mechanical safety of the battery. The ratio of the distance between two adjacent grooves to the length of the inner cavity is preferably a positive integer, and more preferably an integer of 1. That is, the position of the groove 211 on the outer wall 21 corresponds to that of the convex portion 221 on the inner wall 22. According to the present invention, the width and length of the grooves 221 are not specially limited as long as the thickness of the metal shell 2 is in the required range. In the case that other conditions are same, the weight of the battery is inversely proportional to the width and/or length of the grooves. The thickness of the metal shell 2 is the minimal distance between the inner wall and the outer wall of the metal shell, and may be a conventional thickness in this art. According to the present invention, the thickness of the metal shell 2 is preferably 0.1 to 5 mm, and more preferably 0.2 to 2 mm. On the one hand, the grooves 211 provided on the outer wall 21 of the metal shell 2 and the convex portions 221 cooperate with each other, and function together as the strengthening bars for the electrode cores in the inner cavities. On the other hand, the grooves 211 can also lighten the battery and improve the heat dispersion of the battery. According to the above-mentioned, the metal shell 2 may be prepared to possess cross section of the shapes as shown in FIGS. 2 to 5, wherein the chamber comprises multiple round intercommunicated inner cavities arranged in one or more lines. The convex portions 221 and grooves 211 may be formed individually or integratedly with the metal shell 2, and preferably formed integratedly with the metal shell 2. The convex portions 221 and grooves 211 may be respectively provided along the total height of the inner wall 22 and outer wall 21 of the metal shell 2, or along a certain height as long as the above object of the present invention can be achieved. Preferably, the convex portions 221 have the same height as the inner wall 22 of the metal shell 2.

According to this invention, the material of the metal shell is not specially limited, and may be aluminum alloy, copper alloy or nickel-chromium alloy and the like.

Preferably, said end cover assembly 3 comprises a cover, multiple poles, an insulator and a metal connector with the multiple electrode poles being respectively connected with both the electrode terminal of the electrode core 1 and the metal connector, and the insulator being interposed between the cover and the electrode pole. The cover is used to seal the metal shell 2, and the insulator is used to prevent the short circuit caused by the contact between the electrode pole and the cover, and to seal the battery.

More preferably, the lithium ion battery has a structure as shown in FIG. 1, wherein the metal shell 2 is opened at both ends, and the end cover assembly comprises a top cover assembly 3 comprising an upper cover 31, multiple positive poles 32, an insulator (not shown in the drawing) and a first metal connector 33, the multiple positive poles 32 being connected with both the electrode terminal of the electrode core 1 and the first metal connector 33, and the insulator being interposed between the upper cover 31 and the positive pole 32, and a bottom cover assembly.

The upper cover 31, the positive pole 32, the insulator and the first metal connector may be connected in any known manners such as welding, riveting, screwing and the like, and preferably by screwing for the convenience of disassembly and installation. Preferably, there are multiple through holes on the upper cover 31 and the first metal connector 33 through which the positive poles are inserted. Preferably, the through holes have the same number as the positive poles, and are of such size that the positive poles are allowed to pass through. The insulator may be interposed between the upper cover 31 and the positive poles 32 to prevent the contact between them. The size, shape and material of the insulator are not specially limited as long as the short circuit caused by the contact of the upper cover 31 with the positive poles 32 can be prevented and the battery can be well sealed. The positive poles 32 preferably have screw threads on the end outer surface to be screwed with a nut 34 to be fixed to the upper cover 31 with the insulator separating them. The positive poles 32 are also preferably fixed to the first metal connector 33 by a nut 34. More preferably, a gasket 35 is provided between the nut 34 and the upper cover 31 or the first metal connector 33.

The bottom cover assembly may have the same structure as the top cover assembly as above-mentioned, i.e. comprise a lower cover, multiple negative poles, an insulator and a second metal connector. The negative poles are connected to both the electrode terminals of the electrode core and the second metal connector, and the insulator is located between the lower cover and the negative pole. Said lower cover, negative pole, insulator and the second metal connector may be connected in any known manners such as welding, riveting, screwing and the like, and preferably by screwing for the convenience of disassembly and installation. Preferably, there are multiple through holes in the lower cover and the second metal connector, and the negative poles are inserted to the second metal connector through these holes. Preferably, the through holes have the same number as the negative poles, and are of such size that the negative poles are allowed to pass across. The insulator may be interposed between the lower cover and the negative poles to prevent the contact between them. The size, shape and material of the insulator are not specially limited as long as the short circuit caused by the contact of the lower cover with the negative poles can be prevented and the battery can be well sealed. The negative poles preferably have screw threads and are fixed to the lower cover by a nut with the insulator separating them. The negative poles are also preferably fixed to the second metal connector by a nut. More preferably, a gasket is provided between the nut and the lower cover or the second metal connector.

According to the present invention, the covers including the upper cover 31 and the lower cover are not specially limited to particular size and/or shape as long as they can fit to the metal shell 2 to seal the battery well. However, it is preferred that the covers correspond to the outer wall 21 or the inner wall 22 of the metal shell 2 in the size and shape for the convenience of the preparation and use.

Since the present invention mainly relates to the improvement of the metal shell and the end cover assembly, the electrolyte solution is not specially limited, and may be any electrolyte solution suitable for the lithium ion battery. For example, the electrolyte solution may comprise any known lithium salt such as one or more selected from $LiPF_6$, $LiBF_4$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y independently represent an integer of 1-10), LiCl and LiI. The concentration of the lithium salt in the electrolyte solution is preferably 0.1 to 2.0 mol/L, and more preferably 0.7 to 1.6 mol/L.

The assembly process of the battery according to the present invention is not specially limited and it is easy for those skilled in the art to prepare a lithium ion battery according to the above description of the present invention. For example, the battery according to the present invention may be prepared by preparing a positive plate and a negative plate, winding them into an electrode core together with a separating membrane, placing the electrode core into the chamber of a metal shell, and then injecting an electrolyte solution after sealing the end cover assembly.

The present invention will be further illustrated in detail with regard to the following examples.

Example 1

1. Preparation of the Electrode Core

An amount of polyvinylidene fluoride (PVDF) was dissolved in N-methyl-pyrrolidone (NMP), and an amount of $LiCoO_2$ and acetylene black were added thereto and mixed well to form a uniform slurry where the ratio of $LiCoO_2$, PVDF and acetylene black by weight was $LiCoO_2$:acetylene black:PVDF=92:4:4. The prepared slurry was coated on an aluminum sheet with a thickness of 20 μm, and then the aluminum sheet was dried at 120° C., rolled and cut to fabricate a positive plate with a length of 800 mm, a width of 140 mm and a thickness of 100 μm.

An amount of PVDF was dissolved in NMP, and an amount of synthetic graphite were added thereto and mixed well to form a uniform slurry where the ratio of synthetic graphite and PVDF by weight was synthetic graphite:PVDF=95:5. The prepared slurry was coated on a copper sheet having a thickness of 20 μm, and then the copper sheet was dried at 120° C., rolled and cut to fabricate a negative plate with a length of 930 mm, a width of 140 mm and a thickness of 100 μm.

The prepared positive and negative plates were wound with a microporous polypropylene membrane to obtain an electrode core.

2. Assembly of a Battery

Five electrode cores prepared as above were respectively placed in five inner cavities of the metal shell with a thickness of 0.2 mm shown in FIG. 2. The electrode terminals of the positive and negative electrode plates were respectively protruded from the upper and lower ends of the electrode poles, and welded to the positive pole of the top cover assembly and the negative pole of the bottom cover assembly. Then the metal shell was covered with the upper and lower covers, and the poles and the cover were fixed with the nuts and the insulator was provided between them. The positive and negative poles were respectively connected to the first and second metal connectors, and fixed with the nuts after the gaskets being provided thereto. The electrolyte solution prepared by dissolving $LiPF_6$ in the mixed solvent of ethylene carbonate and dimethyl carbonate (1:1) at a concentration of 1 mol/L was injected into the metal shell, and then the metal shell was sealed to manufacture a lithium ion battery with a capacity of 15 Ah.

Example 2

Figure 3:
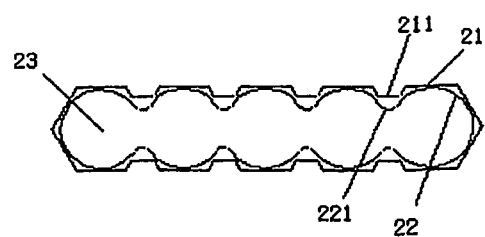

A lithium ion battery was prepared according to Example 1 except that the cross section view of the used metal shell was as shown in FIG. 3.

Example 3

Figure 4:
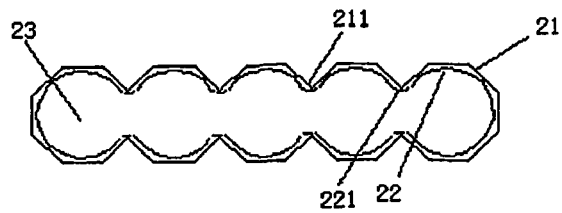
Figure 5:
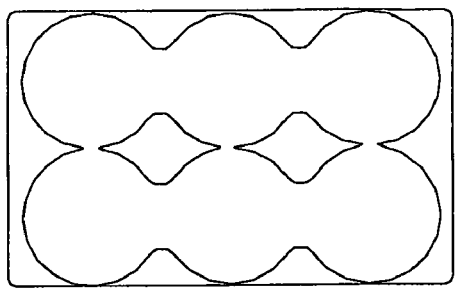

A lithium ion battery was prepared according to Example 1 except that the cross section view of the used metal shell was as shown in FIG. 4.

Comparative Example 1

Figure 6:
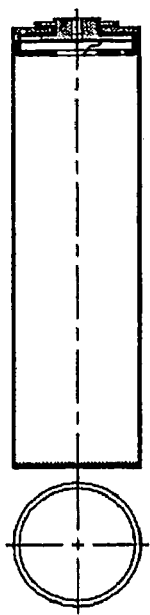
FIG. 6 is a cutaway view showing the cylinder lithium ion battery of the prior art.
Figure 7:
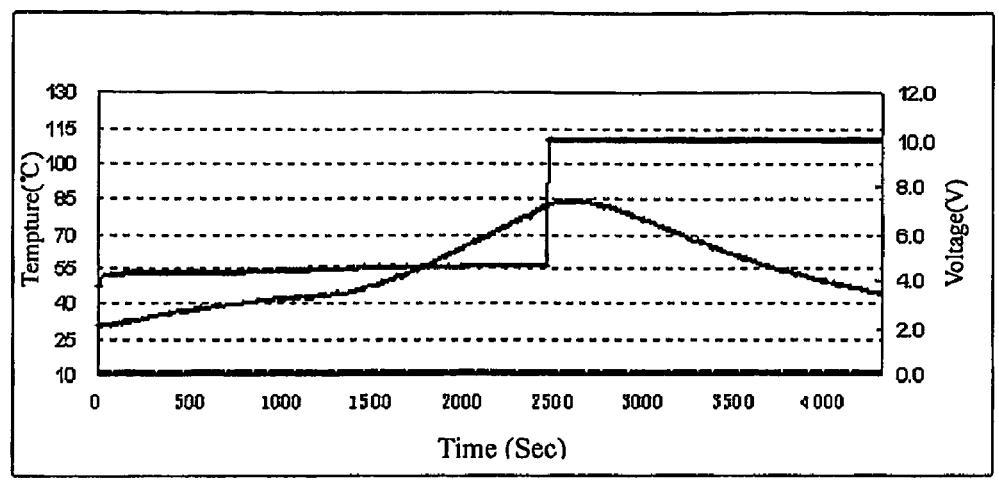
FIG. 7 is a graph where the temperature and voltage are plotted relative to the time during the overcharge experiment of the lithium ion battery prepared in Example 1 of the present invention.
Figure 8:
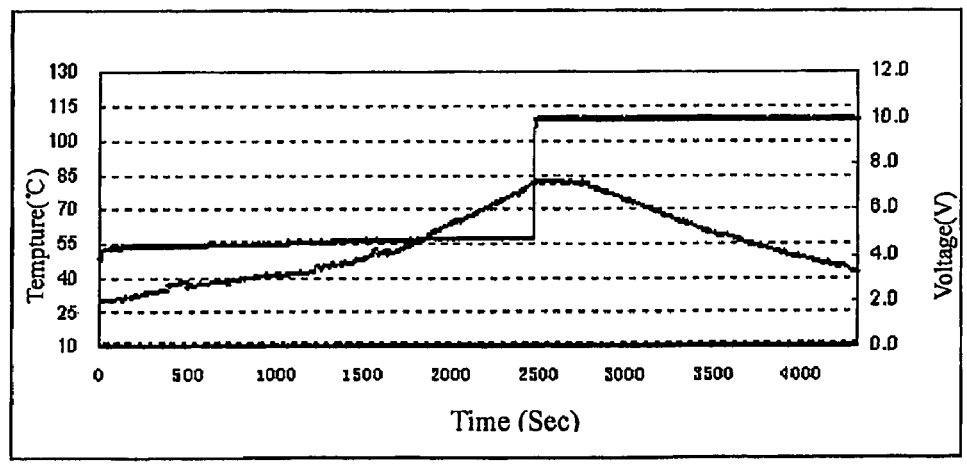
FIG. 8 is a graph where the temperature and voltage are plotted relative to the time during the overcharge experiment of the lithium ion battery prepared in Example 2 of the present invention.
Figure 9:
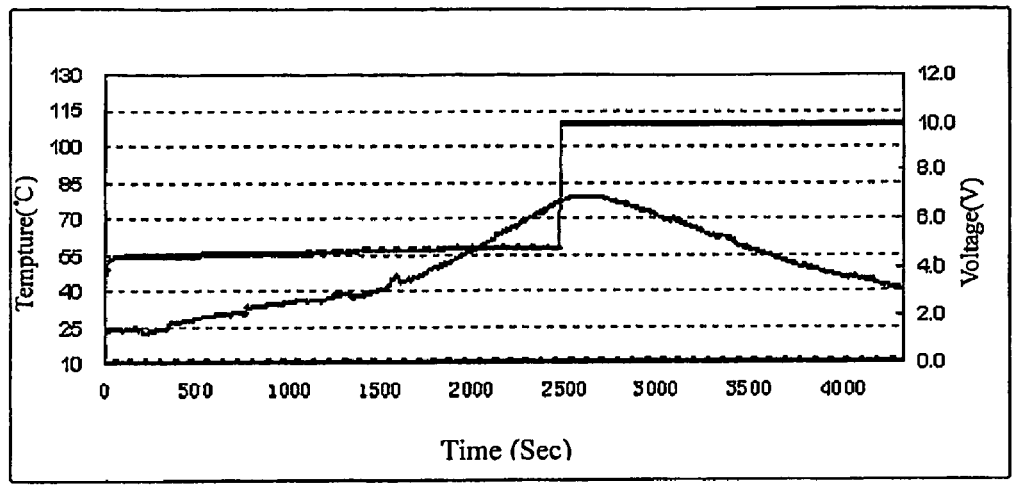
FIG. 9 is a graph where the temperature and voltage are plotted relative to the time during the overcharge experiment of the lithium ion battery prepared in Example 3 of the present invention.
Figure 10:
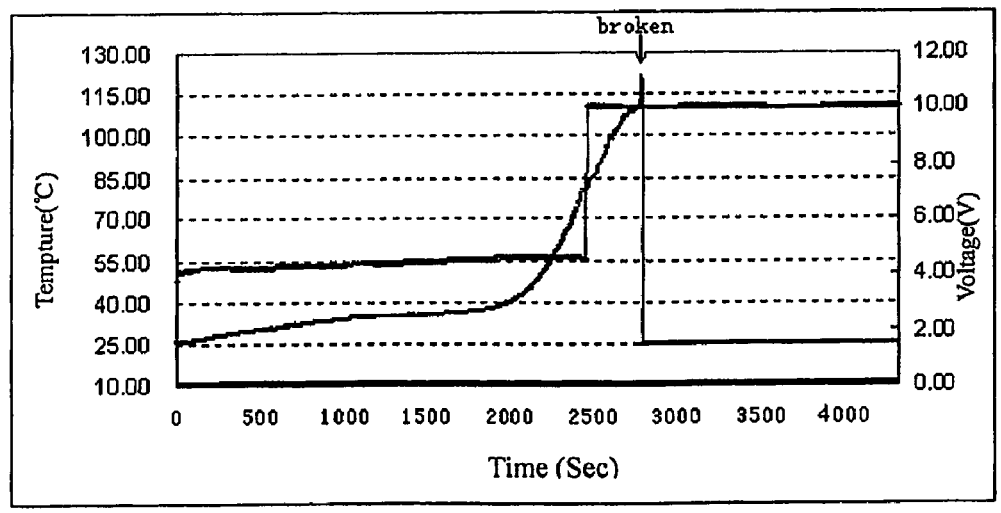
FIG. 10 is a graph where the temperature and voltage are plotted relative to the time during the overcharge experiment of the lithium ion battery prepared in Comparative Example 1.

A lithium ion battery was prepared according to Example 1 except that the cross section view of the used metal shell was as shown in FIG. 6 and the size of the positive and negative plates was 5100 mm (length)×120 mm (width)×100 μm (thickness) and 5150 mm (length)×120 mm (width)×100 μm (thickness) respectively.

Performance Test

1. Test of Overcharge

The lithium ion batteries in fully discharged state of Examples 1 to 3 and Comparative Example 1 were charged to 10 V with a constant current of 1 C at an ambient temperature of 20±5° C. At the same time, the temperature of the surface of the batteries was determined by a thermal couple. The graphs where the temperature and voltage were plotted relative to the time were shown in FIGS. 7 to 10, respectively.

As shown in FIGS. 7 to 10, the temperature of the battery prepared in Comparative Example 1 sharply increased as the voltage increased, and the battery was broken because the generated heat could not be effectively dispersed, while the temperature of the batteries prepared in Examples 1 to 3 slowly increased as the voltage increased, and the peak temperature during the overcharge test was less than 85° C., which showed the batteries prepared in Examples 1 to 3 possessed excellent heat dispersion.

2. Test of the High Rate Discharge Performance $C_{10C}/C_{0.5C}$: The high rate discharge performance was expressed as the ratio of the discharge capacity when the battery was discharged from 4.2 V to 3.0 V respectively with the current of 10 C and 0.5 C.

$C_{3C}/C_{0.5C}$: The high rate discharge performance was expressed as the ratio of the discharge capacity when the battery was discharged from 4.2 V to 3.0 V respectively with the current of 3 C and 0.5 C.

$C_{1C}/C_{0.5C}$: The high rate discharge performance was expressed as the ratio of the discharge capacity when the battery was discharged from 4.2 V to 3.0 V respectively with the current of 1 C and 0.5 C.

The test results were shown in Table 1.

TABLE 1

| Example No. | $C_{1C}/C_{0.5C}$ (%) | $C_{3C}/C_{0.5C}$ (%) | $C_{10C}/C_{0.5C}$ (%) |
|---|---|---|---|
| Example 1 | 99.6 | 91.1 | 87.2 |
| Example 2 | 99.5 | 90.7 | 85.8 |
| Example 3 | 99.8 | 91.4 | 86.2 |
| Comparative Example 1 | 99.2 | 77.3 | 62.5 |

It could be seen from Table 1 that the high rate discharge performance of the batteries of Examples 1 to 3 was significantly improved compared with that of Comparative Example 1 because the efficient section area for conducting the current possessed by the batteries according to the present invention was larger than that according to the prior art by using the top cover assembly and bottom cover assembly comprising multiple electrode poles.

3. Test of Mechanical Shock Tolerance

Each 100 batteries of Examples 1 to 3 and Comparative Example 1 were charged to 4.2 V with the current of 1 C, and then charged at the constant voltage of 4.2 V until the current reduced to 0.05 C. Subsequently the batteries were discharged with the constant current of 0.5 C for 100 minutes, and then subjected to 20 times shock on both faces in three vertical directions by using a shock tester with the peak acceleration of 10 G. The ratio of the short circuit of the batteries was determined. After the above test was finished, the batteries were discharged to 3.0 V with the current of 1 C, and the inner resistance was detected to calculate the ratio of chop. The results were shown in Table 2.

TABLE 2

| Example No. | ratio of the shock of short circuit | ratio of chop for the inner resistance |
|---|---|---|
| Example 1 | 0 | 0 |
| Example 2 | 0 | 0 |
| Example 3 | 0 | 0.2% |
| Comparative Example 1 | 1% | 2.5% |

It could be seen from Table 2 that the mechanical safety of the batteries of Examples 1 to 3 was significantly higher compared with that of Comparative Example 1 because the multiple parallel grooves formed on the outer wall of the metal shell in the batteries according to the present invention function as the strengthening bars, whereby avoiding the battery from the short circuit and the inner resistance change caused by the shock of outside force in case of falling, concussion and the like.

It could be seen from the above results that the lithium ion battery according to the present invention possessed excellent heat dispersion, high mechanical safety, and good high rate discharge performance. In addition, the process for preparation is simplified by placing abreast multiple wound electrode cores in the metal shell and dividing the electrode core of the high capacity into several ones of lower capacity to avoid the problems of the "would battery" of the prior art that the electrode plate is long and difficult to wind, and the problems of the "stacked battery" of the prior art that the electrode plate is difficult to prepare and pile up.

What we claim is:

1. A lithium ion battery comprising:
an electrode core;
an electrolyte solution;
a metal shell; and
an end cover assembly,
said metal shell comprising an outer wall, an inner wall and a chamber,
said electrode core and electrolyte solution being located in the chamber of the metal shell, and
said electrode core being connected to the end cover assembly with an electrode terminal of the electrode core, wherein
the number of said electrode core is more than one, and the multiple electrode cores are located in the chamber of the metal shell,
the chamber comprises multiple intercommunicated inner cavities, each of which holds one electrode core,
multiple convex portions are provided on the inner wall of the metal shell and allow the electrolyte solution to pass therethrough, and
one inner cavity comprises the space formed by each two adjacent convex portions and the inner wall of the metal shell.

2. The battery according to claim 1, wherein the convex portions have the same height as the inner wall of the metal shell.

3. The battery according to claim 2, wherein the convex portions are symmetrically provided in the direction along the length of the metal shell, and the distance between two convex portions symmetrically provided is 50 to 90% of the maximum width of the inner cavity.

4. The battery according to claim 1, wherein multiple grooves are provided on the outer wall of the metal shell and the position of the groove corresponds to that of the convex portion.

5. The battery according to claim 1, wherein said end cover assembly comprises a cover, multiple electrode poles, an insulator and a metal connector, the multiple electrode poles are respectively connected to the electrode terminals of the electrode core and the metal connector, and the insulator is located between the cover and the electrode poles.

6. The battery according to claim 5, wherein the cover and the metal connector each has multiple holes through which the electrode poles are inserted, and the electrode poles further have screw threads on the end outer surfaces to be screwed with a nut.

7. The battery according to claim 1, wherein the metal shell is opened at both ends and the end cover assembly comprises:
a top cover assembly comprising an upper cover, multiple positive poles, an insulator, and a first metal connector, the multiple positive poles being connected to both the electrode terminal of the electrode core and the first metal connector, and the insulator being located between the upper cover and the positive pole, and
a bottom cover assembly comprising a lower cover, multiple negative poles, an insulator and a second metal connector, the multiple negative poles being connected to both the electrode terminal of the electrode core and the second metal connector, and the insulator being located between the lower cover and the negative pole.

8. The battery according to claim 7, wherein the cover and the metal connector each has multiple holes through which the electrode poles are inserted, and the electrode poles further have screw threads on the end outer surfaces to be screwed with a nut.

* * * * *